US012677105B2

(12) United States Patent
Kim et al.

(10) Patent No.: US 12,677,105 B2
(45) Date of Patent: Jul. 7, 2026

(54) METHOD AND DEVICE FOR ENHANCING SOUND QUALITY AND REDUCING CURRENT CONSUMPTION

(71) Applicant: Samsung Electronics Co., Ltd., Suwon-si (KR)

(72) Inventors: Yangsu Kim, Suwon-si (KR); Gangyoul Kim, Suwon-si (KR); Youngsoo Park, Suwon-si (KR); Hakhoon Song, Suwon-si (KR); Namwoog Lee, Suwon-si (KR); Keunwon Jang, Suwon-si (KR); Hyunmin Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 158 days.

(21) Appl. No.: 18/791,936

(22) Filed: Aug. 1, 2024

(65) Prior Publication Data

US 2024/0397276 A1 Nov. 28, 2024

Related U.S. Application Data

(63) Continuation of application No. PCT/KR2022/020238, filed on Dec. 13, 2022.

(30) Foreign Application Priority Data

Feb. 8, 2022 (KR) ........................ 10-2022-0016520
Apr. 13, 2022 (KR) ........................ 10-2022-0045773

(51) Int. Cl.

| | |
|---|---|
| ***H04R 29/00*** | (2006.01) |
| ***G10L 25/03*** | (2013.01) |
| *G10L 25/30* | (2013.01) |

(52) U.S. Cl.
CPC ............ *H04R 29/004* (2013.01); *G10L 25/03* (2013.01); *G10L 25/30* (2013.01)

(58) Field of Classification Search
None
See application file for complete search history.

(56) References Cited

U.S. PATENT DOCUMENTS 10,187,516 B2 1/2019 Kang
10,387,101 B2 8/2019 Kim et al.
(Continued)

FOREIGN PATENT DOCUMENTS

KR 10-2006-0022490 A 3/2006
KR 10-2016-0139649 A 12/2016
(Continued)

OTHER PUBLICATIONS

International Search Report dated Mar. 22, 2023, issued in International Patent Application No. PCT/KR2022/020238.
(Continued)

*Primary Examiner* — Brian T Pendleton
(74) *Attorney, Agent, or Firm* — Jefferson IP Law, LLP

(57) ABSTRACT

An electronic device is provided. The electronic device includes a microphone, memory storing one or more computer programs, and one or more processors communicatively connected to the microphone and the memory, wherein the one or more computer programs include computer-executable instructions that, when executed by the one or more processors individually or collectively, cause the electronic device to acquire, through an application, a request for performing a call with another electronic device, in response to the acquisition of the request, identify a first sampling rate corresponding to a frequency band supported by the application so as to perform communication with another electronic device, acquire an audio signal through (Continued)

the microphone, identify a frequency band of the audio signal, determine a type of the audio signal, based on the frequency band, determine a second sampling rate corresponding to the audio signal, based on the type of the audio signal, determine a third sampling rate corresponding to a frequency band for performing a call with another electronic device, based on the first sampling rate and the second sampling rate, determine a clock and a tuning parameter, based on the third sampling rate, and tune the audio signal, based on the clock and the tuning parameter.

18 Claims, 7 Drawing Sheets

(56) References Cited

U.S. PATENT DOCUMENTS

| | | | | |
|---|---|---|---|---|
| 10,560,939 | B2 | 2/2020 | Jung et al. | |
| 11,089,077 | B2 * | 8/2021 | Kang | H04L 65/80 |
| 11,128,955 | B1 | 9/2021 | Li et al. | |
| 11,398,242 | B2 * | 7/2022 | Kim | G10L 21/0216 |
| 11,562,763 | B2 * | 1/2023 | Lee | H04R 1/1041 |
| 2006/0053011 | A1 | 3/2006 | Kim | |
| 2013/0231158 | A1 | 9/2013 | Schell | |
| 2014/0093093 | A1 | 4/2014 | Dusan et al. | |
| 2014/0211965 | A1 | 7/2014 | Hetherington | |
| 2015/0269954 | A1 * | 9/2015 | Ryan | G10L 15/28 704/233 |
| 2016/0295024 | A1 * | 10/2016 | Chen | H04M 3/42382 |
| 2017/0047077 | A1 * | 2/2017 | Lee | G10L 25/81 |
| 2019/0027156 | A1 | 1/2019 | Sung et al. | |

FOREIGN PATENT DOCUMENTS

| | | | |
|---|---|---|---|
| KR | 10-2017-0052056 | A | 5/2017 |
| KR | 10-2017-0052090 | A | 5/2017 |
| KR | 10-2017-0060314 | A | 6/2017 |
| KR | 10-2017-0091361 | A | 8/2017 |
| KR | 10-2019-0044912 | A | 5/2019 |
| KR | 10-2020-0030912 | A | 3/2020 |
| KR | 10-2021-0101670 | A | 8/2021 |
| KR | 10-2021-0135847 | A | 11/2021 |

OTHER PUBLICATIONS

Extended European Search Report dated Mar. 11, 2025, issued in European Patent Application No. 22926210.0.

* cited by examiner

METHOD AND DEVICE FOR ENHANCING SOUND QUALITY AND REDUCING CURRENT CONSUMPTION

CROSS-REFERENCE TO RELATED APPLICATION(S)

This application is a continuation application, claiming priority under § 365 (c), of an International application No. PCT/KR2022/020238, filed on Dec. 13, 2022, which is based on and claims the benefit of a Korean patent application number 10-2022-0016520, filed on Feb. 8, 2022, in the Korean Intellectual Property Office, and of a Korean patent application number 10-2022-0045773, filed on Apr. 13, 2022, in the Korean Intellectual Property Office, the disclosure of each of which is incorporated by reference herein in its entirety.

BACKGROUND

1. Field

The disclosure relates to a method and device for enhancing sound quality and reducing current consumption by using a call application and sampling rate information of a transceived signal, during a call.

2. Description of Related Art

When an electronic device (e.g., a smart phone) performs a call connection with another electronic device (e.g., a smart phone), the electronic device can set a sampling rate and a clock for processing an audio signal, based on codec information determined through information exchange with a base station. In an example, when the electronic device performs a voice over long term evolution (VOLTE) call connection with another electronic device, an internet protocol (IP) multimedia subsystem (IMS) service of the electronic device can determine codec information to be used during a call connection, through information exchange with the base station. The electronic device can set a sampling rate and a clock, based on the codec information, through a pre/post-processing unit. The electronic device can, for example, transmit an audio signal processed through the pre/post-processing unit, to another electronic device, based on the set sampling rate and clock, thereby performing a call connection.

The above information is presented as background information only to assist with an understanding of the disclosure. No determination has been made, and no assertion is made, as to whether any of the above might be applicable as prior art with regard to the disclosure.

SUMMARY

When codec information an electronic device and another electronic device will use during a call connection is determined, the electronic device can fixedly apply a preset sampling rate and clock, based on the codec information, while performing a call connection with another electronic device. The electronic device can perform a call connection with another electronic device by using a sampling rate and a clock that are set through information exchange with a base station, regardless of a sampling rate of an audio signal acquired through a microphone of the electronic device or a sampling rate of an audio signal received from another electronic device. When the sampling rate set through the information exchange between the electronic device and the base station is different from the sampling rate of the audio signal, current consumption can occur due to an unnecessary clock setting, and a tuning parameter not matching the sampling rate of the transceived audio signal can be applied to the audio signal, making it difficult to provide optimal sound quality. For example, when the sampling rate of the audio signal acquired through the microphone of the electronic device or the sampling rate of the audio signal received from another electronic device is lower than the sampling rate that is set through the information exchange between the electronic device and the base station, the current consumption can occur due to the unnecessary clock setting, and a tuning parameter corresponding to a sampling rate different from the sampling rate of the transceived audio signal can be applied to the audio signal, making it difficult to provide optimal sound quality.

Various embodiments disclosed in this document can reduce unnecessary current consumption and enhance call quality.

Aspects of the disclosure are to address at least the above-mentioned problems and/or disadvantages and to provide at least the advantages described below. Accordingly, an aspect of the disclosure is to provide a method and device for enhancing sound quality and reducing current consumption by using a call application and sampling rate information of a transceived signal, during a call.

Additional aspects will be set forth in part in the description which follows and, in part, will be apparent from the description, or may be learned by practice of the presented embodiments.

In accordance with an aspect of the disclosure, an electronic device is provided. The electronic device includes a microphone, memory storing one or more computer programs, and one or more processors communicatively connected to the microphone and the memory, wherein the one or more computer programs include computer-executable instructions that, when executed by the one or more processors individually or collectively, cause the electronic device to acquire, through an application, a request for performing a call with another electronic device, in response to the acquisition of the request, identify a first sampling rate corresponding to a frequency band supported by the application so as to perform communication with another electronic device, acquire an audio signal through the microphone, identify a frequency band of the audio signal, determine a type of the audio signal, based on the frequency band, determine a second sampling rate corresponding to the audio signal, based on the type of the audio signal, determine a third sampling rate corresponding to a frequency band for performing a call with another electronic device, based on the first sampling rate and the second sampling rate, determine a clock and a tuning parameter, based on the third sampling rate, and tune the audio signal, based on the clock and the tuning parameter.

In accordance with another aspect of the disclosure, an electronic device is provided. The electronic device includes a speaker, a communication circuit, memory storing one or more computer programs, and one or more processors communicatively connected to the speaker, the communication circuit, and the memory, wherein the one or more computer programs include computer-executable instructions that, when executed by the one or more processors individually or collectively, cause the electronic device to acquire, through an application, a request for performing a call with another electronic device, in response to the acquisition of the request, identify a first sampling rate corresponding to a frequency band supported by the application so as to perform communication with another electronic device, acquire an audio signal from another electronic device through the communication circuit, identify a frequency band of the audio signal, determine a type of the audio signal, based on the frequency band, determine a second sampling rate corresponding to the audio signal, based on the type of the audio signal, determine a third sampling rate corresponding to a frequency band for performing a call with another electronic device, based on the first sampling rate and the second sampling rate, determine a clock and a tuning parameter, based on the third sampling rate, tune the audio signal, based on the clock and the tuning parameter, and output the tuned audio signal through a speaker.

In accordance with another aspect of the disclosure, an electronic device is provided. The electronic device includes a microphone, a communication circuit, memory storing one or more computer programs, and one or more processors communicatively connected to the microphone, the communication circuit, and the memory, wherein the one or more computer programs include computer-executable instructions that, when executed by the one or more processors individually or collectively, cause the electronic device to acquire, through an application, a request for performing a call with another electronic device, in response to the acquisition of the request, identify a first sampling rate corresponding to a frequency band supported by the application so as to perform communication with another electronic device, receive an audio signal acquired through a microphone included in an external device, from the external device connected to the electronic device, through the communication circuit, identify a frequency band of the audio signal, determine a type of the audio signal, based on the frequency band, determine a second sampling rate corresponding to the audio signal, based on the type of the audio signal, determine a third sampling rate corresponding to a frequency band for performing a call with another electronic device, based on the first sampling rate and the second sampling rate, determine a clock and a tuning parameter, based on the third sampling rate, and tune the audio signal, based on the clock and the tuning parameter.

In accordance with another aspect of the disclosure, an operation method is provided. The operation method includes acquiring, through an application, a request for performing a call with another electronic device, in response to the acquisition of the request, identifying a first sampling rate corresponding to a frequency band supported by the application so as to perform communication with another electronic device, acquiring an audio signal through a microphone, identifying a frequency band of the audio signal, determining the type of the audio signal, based on the frequency band, determining a second sampling rate corresponding to the audio signal, based on the type of the audio signal, determining a third sampling rate corresponding to a frequency band for performing a call with another electronic device, based on the first sampling rate and the second sampling rate, determining a clock and a tuning parameter, based on the third sampling rate, and tuning the audio signal, based on the clock and the tuning parameter.

In accordance with another aspect of the disclosure, one or more non-transitory computer-readable storage media storing one or more computer programs including computer-executable instructions that, when executed by one or more processors of an electronic device individually or collectively, cause the electronic device to perform operations, the operations are provided. The operations include acquiring, through an application, a request for performing a call with another electronic device, in response to the acquisition of the request, identifying a first sampling rate corresponding to a frequency band supported by the application so as to perform communication with another electronic device, acquiring an audio signal through a microphone, identifying a frequency band of the audio signal, determining a type of the audio signal, based on the frequency band, determining a second sampling rate corresponding to the audio signal, based on the type of the audio signal, determining a third sampling rate corresponding to a frequency band for performing a call with another electronic device, based on the first sampling rate and the second sampling rate, determining a clock and a tuning parameter, based on the third sampling rate, and tuning the audio signal, based on the clock and the tuning parameter.

According to various embodiments disclosed in this document, when an electronic device performs a call connection with another electronic device, the electronic device can compare a sampling rate, which is set through information exchange between the electronic device and a base station, with a sampling rate of a transceived audio signal, thereby determining a sampling rate for tuning an audio signal, and can determine a clock and a tuning parameter corresponding to the determined sampling rate. Through this, the electronic device can tune the transceived audio signal through the determined clock and tuning parameter, and perform a call connection with another electronic device through the tuned audio signal, thereby reducing unnecessary current consumption and enhancing call sound quality.

In addition, various effects directly or indirectly identified through this document may be provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an integrated circuit (IC), or the like FIG. 1 is a block diagram illustrating an electronic device 101 in a network environment 100 according to an embodiment of the disclosure.

Figure 1:
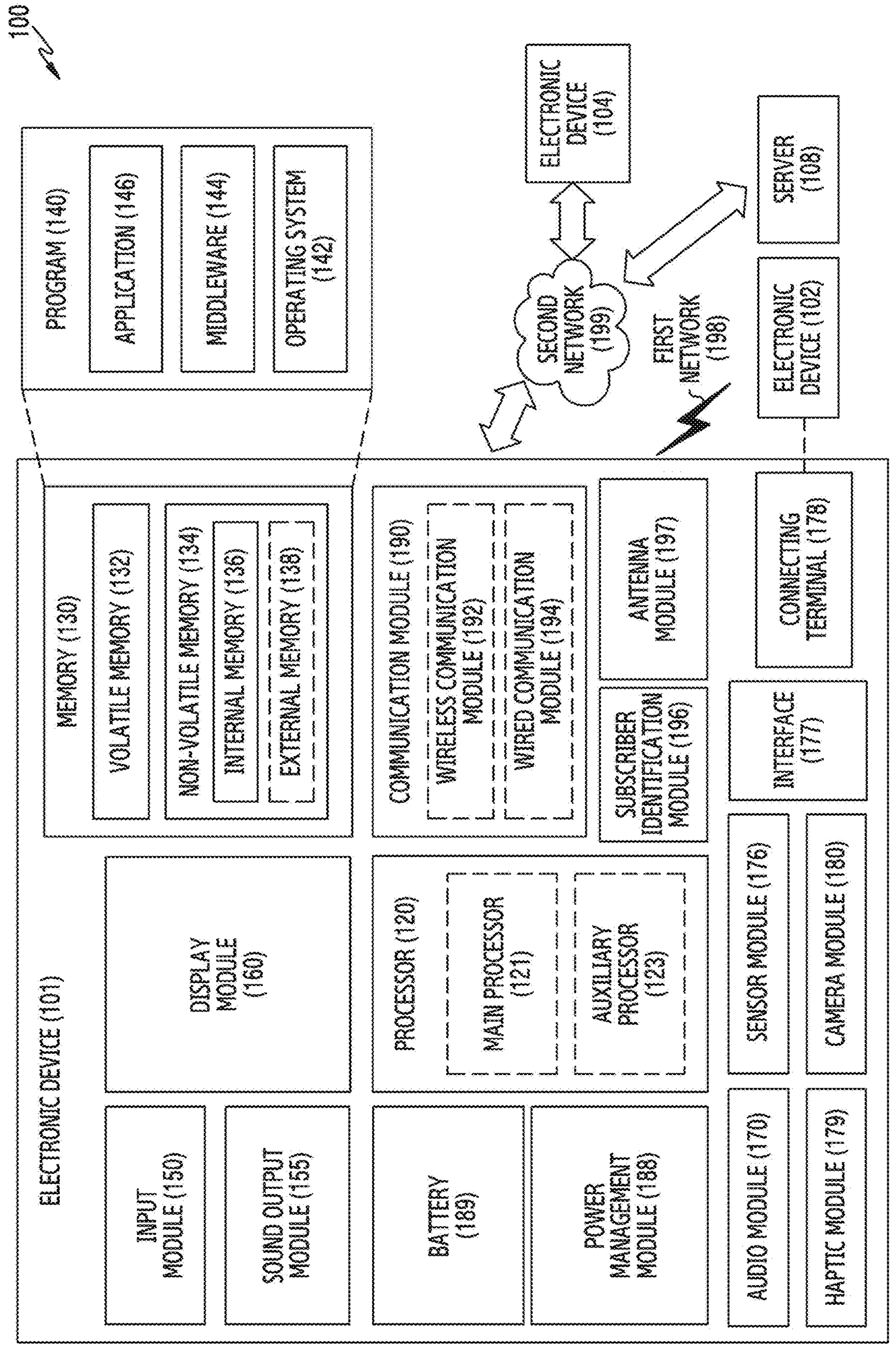
FIG. 1 illustrates a block diagram of an electronic device in a network environment, according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to one embodiment, the electronic device 101 may communicate with the electronic device 104 via the server 108. According to another embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. In an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to another embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. When the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). In an embodiment, the auxiliary processor 123 (e.g., an image signal processor or a communication processor) may be implemented as part of another component (e.g., the camera module 180 or the communication module 190) functionally related to the auxiliary processor 123. In another embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may be configured to store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to another embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to another embodiment, the display module 160 may include a touch sensor adapted to detect a touch, or a pressure sensor adapted to measure the intensity of force incurred by the touch.

The audio module 170 may convert a sound into an electrical signal and vice versa. In another embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to one embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to another embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to another embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. In another embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to one embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mm Wave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 G gigabits per second (bps) or more) for implementing eMBB, loss coverage (e.g., 164 dB or less) for implementing mMTC, or U-plane latency (e.g., 0.5 milliseconds (ms) or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to another embodiment, the antenna module 197 may include an antenna including a radiating element composed of a conductive material or a conductive pattern formed in or on a substrate (e.g., a printed circuit board (PCB)). According to yet another embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

The antenna module 197 may form a mmWave antenna module. According to an embodiment, the mm Wave antenna module may include a printed circuit board, an RFIC disposed on a first surface (e.g., the bottom surface) of the printed circuit board, or adjacent to the first surface and capable of supporting a designated high-frequency band (e.g., the mm Wave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may, for example, provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. In an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1 st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). In an example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to some embodiments, each component (e.g., a module or a program) of the above-described components may include a single entity or multiple entities, and some of the multiple entities may be separately disposed in different components. According to other embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
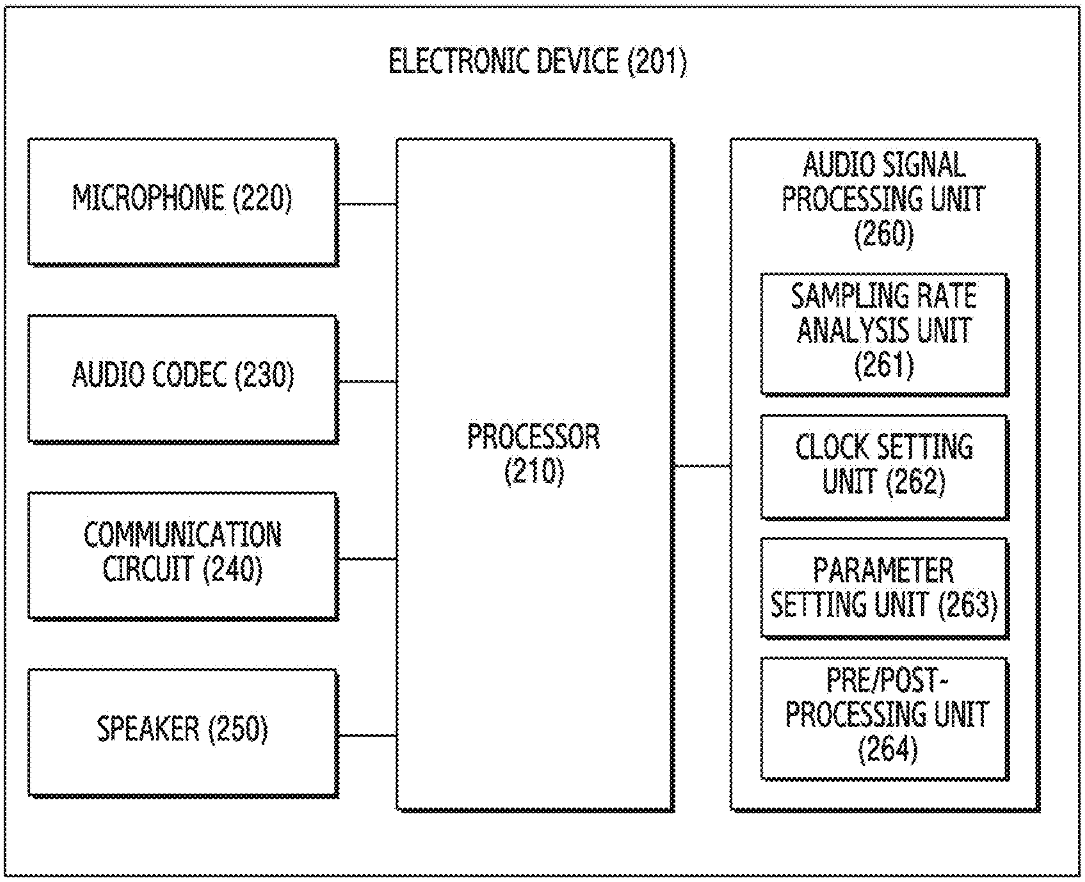
FIG. 2 illustrates a block diagram of an electronic device according to an embodiment of the disclosure.

FIG. 2 illustrates a block diagram of an electronic device 201 according to an embodiment of the disclosure.

Referring to FIG. 2, an electronic device 201 may include a processor 210, a microphone 220, an audio codec 230, a communication circuit 240, a speaker 250, an audio signal processing unit 260, a sampling rate analysis unit 261, a clock setting unit 262, a parameter setting unit 263, and a pre/post-processing unit 264. The pre/post-processing unit 264 may be, for example, formed as a single component or be formed as an independent component (e.g., a pre-processing unit and a post-processing unit). Components included in the electronic device 201 may not be limited to the components (e.g., the processor 210, the microphone 220, the audio codec 230, the communication circuit 240, the speaker 250, the audio signal processing unit 260, the sampling rate analysis unit 261, the clock setting unit 262, the parameter setting unit 263, and the pre/post-processing unit 264) shown in FIG. 2. The components of the electronic device 201 shown in FIG. 2 may be replaced with other components, or additional components may be added to the electronic device 201. For example, at least a portion of the contents of the electronic device 101 of FIG. 1 may be applied to the electronic device 201 of FIG. 2. In another example, the electronic device 201 may further include memory.

In an embodiment, the processor 210 may execute instructions stored in the memory and control operations of the components (e.g., the microphone 220, the audio codec 230, the communication circuit 240, the speaker 250, the audio signal processing unit 260, the sampling rate analysis unit 261, the clock setting unit 262, the parameter setting unit 263, and the pre/post-processing unit 264) of the electronic device 201. The processor 210 may be electrically and/or operatively connected to the microphone 220, the audio codec 230, the communication circuit 240, the speaker 250, and the audio signal processing unit 260. The processor 210 may, for example, execute software and control at least one another component (e.g., the microphone 220, the audio codec 230, the communication circuit 240, the speaker 250, the audio signal processing unit 260, the sampling rate analysis unit 261, the clock setting unit 262, the parameter setting unit 263, and the pre/post-processing unit 264) connected to the processor 210. The processor 210 may acquire (or receive) instructions from the components included in the electronic device 201, may interpret the acquired (or received) instructions, and may process and/or compute various data according to the interpreted instructions.

According to another embodiment, the microphone 220 may acquire (or receive) audio from the outside. For example, the microphone 220 may acquire audio corresponding to a user's voice. For another example, the microphone 220 may acquire audio corresponding to music. The electronic device 201 may acquire audio through the microphone 220.

According to yet another embodiment, the audio codec 230 may convert an analog signal of voice or video into a digital signal, or convert a digital signal into an analog signal. The audio codec 230 may include a coder that converts an analog signal into a digital signal and performs encoding, and a decoder that converts a digital signal into an analog signal and performs decoding. The audio codec 230 may be implemented as a component consisting of software or hardware. For example, the audio codec 230 is an algorithm driven by the processor 210 and may be understood as software. The audio codec 230 may be understood as hardware in which the algorithm is implemented by the processor 210. The audio codec 230 may be implemented as one component (e.g., a single chip) or a plurality of components (e.g., a plurality of chips).

The communication circuit 240 may support communication execution between the electronic device 201 (e.g., a smart phone) and another electronic device (e.g., a smart phone) by using wired communication or wireless communication. For example, the electronic device 201 may perform a call connection with another electronic device 301 by performing long-range wireless communication through the communication circuit 240.

According to an embodiment, the speaker 250 may output audio. For example, the speaker 250 may output audio corresponding to a user's voice. For another example, the speaker 250 may output audio corresponding to music. The electronic device 201 may output audio through the speaker 250.

In another embodiment, the audio signal processing unit 260 may process an audio signal acquired through the microphone 220 or an audio signal acquired through the communication circuit 240. For example, the audio signal processing unit 260 may process an audio signal corresponding to a user's voice acquired through the microphone 220. For another example, the audio signal processing unit 260 may process an audio signal corresponding to a user's voice of another electronic device 301 received from another electronic device 301 through the communication circuit 240.

In still another embodiment, the audio signal processing unit 260 may be implemented as a component consisting of software or hardware. For example, the audio signal processing unit 260 is an algorithm driven by the processor 210 and may be understood as software. For another example, the audio signal processing unit 260 may be understood as hardware in which the algorithm is implemented by the processor 210. The audio signal processing unit 260 may be implemented as one component (e.g., a single chip) or a plurality of components (e.g., a plurality of chips).

The audio signal processing unit 260 may include the sampling rate analysis unit 261, the clock setting unit 262, the parameter setting unit 263, and the pre/post-processing unit 264. Components (e.g., the sampling rate analysis unit 261, the clock setting unit 262, the parameter setting unit 263, and the pre/post-processing unit 264) included in the audio signal processing unit 260 may be implemented as components consisting of software or hardware. When the components (e.g., the sampling rate analysis unit 261, the clock setting unit 262, the parameter setting unit 263, and the pre/post-processing unit 264) included in the audio signal processing unit 260 are components consisting of hardware, the components may be understood as hardware components (e.g., chips) that are formed independently or by merging at least one of them.

The sampling rate analysis unit 261 may identify a sampling rate of an audio signal acquired through the microphone 220. The sampling rate analysis unit 261 may identify a frequency band of the audio signal. The sampling rate analysis unit 261 may identify the type of the audio signal, based on the frequency band of the audio signal. For example, the sampling rate analysis unit 261 may determine the type of the audio signal as one of a user's voice or music, based on the frequency band of the audio signal. The sampling rate analysis unit 261 may determine a sampling rate corresponding to the audio signal, based on the determined type of the audio signal.

According to an embodiment, the sampling rate analysis unit 261 may identify a sampling rate of an audio signal received from another electronic device 301 through the communication circuit 240. The sampling rate analysis unit 261 may identify the type of the audio signal, based on a frequency band of the audio signal. For example, the sampling rate analysis unit 261 may determine the type of the audio signal as one of a user's voice or music, based on the frequency band of the audio signal. The sampling rate analysis unit 261 may, for example, determine a sampling rate corresponding to the audio signal received from another electronic device 301 through the communication circuit 240, based on the determined type of the audio signal.

According to another embodiment, the sampling rate analysis unit 261 may compare a first sampling rate, which is determined through information exchange between an IP multimedia subsystem (IMS) service and a base station, with a second sampling rate of a transceived audio signal (e.g., a sampling rate of an audio signal acquired through the microphone 220 or a sampling rate of an audio signal received from another electronic device 301 through the communication circuit 240). Based on the comparison result, the sampling rate analysis unit 261 may determine a third sampling rate used for a call connection between the electronic device 201 and another electronic device 301. The third sampling rate may be understood as a sampling rate for tuning an audio signal that is transceived during a call connection.

According to yet another embodiment, the clock setting unit 262 may set a clock for the operation of the pre/post-processing unit 264, based on the third sampling rate. The clock is a unit representing the speed of the processor 210, and the clock may refer to the time at which a wavelength moves once per second. The speed of the processor 210 may vary depending on the amount of data the processor 210 processes during the time. The higher a value of the third sampling rate is, the more algorithms the processor 210 must process are, so a clock value may also increase.

According to an embodiment, the parameter setting unit 263 may set a tuning parameter, based on the third sampling rate determined through the sampling rate analysis unit 261.

The pre/post-processing unit 264 may tune an audio signal acquired through the microphone 220, based on the set tuning parameter. The pre/post-processing unit 264 may tune the audio signal acquired through the microphone 220 by using a pre-processing solution, based on the set tuning parameter. The pre-processing solution may include at least one of a noise reduction and echo cancellation (NREC), a filter, an automatic gain control (AGC), and a volume, but is not limited thereto.

According to another embodiment, the pre/post-processing unit 264 may tune an audio signal acquired through the communication circuit 240 by using a post-processing solution, based on the set tuning parameter. The post-processing solution may include at least one of a far-end noise suppressor (FENS), a filter, an AGC, and a volume, but is not limited thereto.

Figure 3:
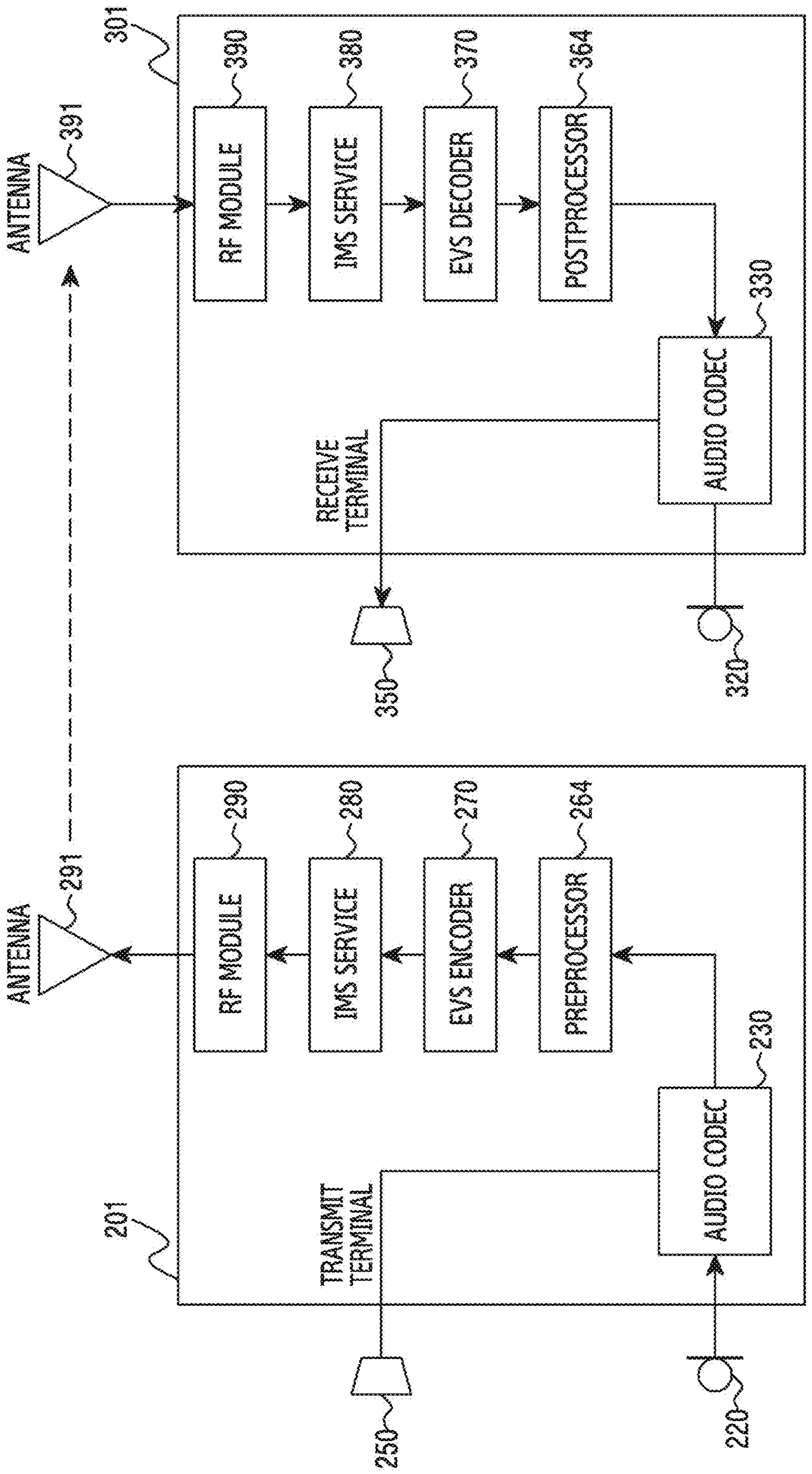
FIG. 3 illustrates a path through which an audio signal is processed in an electronic device and another electronic device during a call connection between the electronic device and another electronic device, according to an embodiment of the disclosure.

FIG. 3 illustrates a path through which an audio signal is processed in the electronic device 201 and another electronic device 301 during a call connection between the electronic device 201 and another electronic device 301, according to an embodiment of the disclosure.

Contents overlapping the description contents of FIG. 2 may be omitted below.

Referring to FIG. 3, an electronic device 201 may process an audio signal acquired through the microphone 220 through internal components (e.g., a preprocessor 265 and an EVS encoder 270), and transmit to another electronic device 301 through an RF module 290 and an antenna 291. Another electronic device 301 may process the audio signal received from the electronic device 201 through internal components (e.g., an EVS decoder 370 and a postprocessor 364), and output to a speaker 350.

According to an embodiment, the electronic device 201 may include a microphone 220, an audio codec 230, a speaker 250, the preprocessor 265, the EVS encoder 270, an IMS service 280, the RF module 290, and the antenna 291.

Some of the components (e.g., the microphone 220, the audio codec 230, the speaker 250, the preprocessor 265, the EVS encoder 270, the IMS service 280, the RF module 290, and the antenna 291) shown in FIG. 3 may be software components or be components shown for convenience of explanation. For example, the audio codec 230, the preprocessor 265, the EVS encoder 270, and the IMS service 280 may be software components.

Another electronic device 301 may include a microphone 320, an audio codec 330, the speaker 350, the postprocessor 364, the EVS decoder 370, an IMS service 380, an RF module 390, and an antenna 391. Some of the components (e.g., the microphone 320, the audio codec 330, the speaker 350, the postprocessor 364, the EVS decoder 370, the IMS service 380, the RF module 390, and the antenna 391) shown in FIG. 3 may be software components or be components shown for convenience of explanation. For example, the audio codec 330, the postprocessor 364, the EVS decoder 370, and the IMS service 380 may be software components. FIG. 3 illustrates that the microphones 220 and 320, the speakers 250 and 350, and the antennas 291 and 391 are located outside the electronic device 201 and another electronic device 301, respectively, but this is just for convenience of explanation, and at least some of the microphones 220 and 320, the speakers 250 and 350, and the antennas 291 and 391 may be located inside, or in a housing of, the electronic device 201 and another electronic device 301, respectively.

According to another embodiment, the electronic device 201 may acquire an audio signal through the microphone 220. The audio signal may be an analog signal. The audio signal may include a user's voice or music.

According to still another embodiment, the electronic device 201 may convert an audio signal corresponding to an analog signal into a digital signal through the audio codec 230. For example, the electronic device 201 may convert an audio signal of a user's voice corresponding to an analog signal into a digital signal through the audio codec 230. For another example, the electronic device 201 may convert an audio signal of music corresponding to an analog signal into a digital signal through the audio codec 230.

According to an embodiment, the electronic device 201 may process (or tune) an audio signal converted into a digital signal through the preprocessor 265. The electronic device 201 may process (or tune) the audio signal through the preprocessor 265, based on a predetermined sampling rate (e.g., the third sampling rate described in FIG. 2) and a clock. For example, the electronic device 201 may cancel an echo of the audio signal through the preprocessor 265, based on the predetermined sampling rate. For another example, the electronic device 201 may adjust a gain of the audio signal through the preprocessor 265, based on the predetermined sampling rate. For further example, the electronic device 201 may adjust a volume of the audio signal through the preprocessor 265, based on the predetermined sampling rate. The operation of determining the predetermined sampling rate is described in detail in FIGS. 4 and 5.

The electronic device 201 may encode the tuned audio signal through the enhanced voice service (EVS) encoder 270. The electronic device 201 may identify the type of the processed (or tuned) audio signal through the EVS encoder 270. For example, the electronic device 201 may identify the type of the processed audio signal as one of a user's voice or music through the EVS encoder 270. The electronic device 201 may perform encoding corresponding to the type of the processed audio signal through the EVS encoder 270. In an example, when the type of the processed audio signal is the user's voice, the electronic device 201 may perform code excitation linear prediction (CELP) encoding on the processed audio signal through the EVS encoder 270. In another example, when the type of the processed audio signal is music, the electronic device 201 may perform modified discrete cosine transform (MDCT) encoding on the processed audio signal through the EVS encoder 270.

According to another embodiment, the electronic device 201 may transmit the encoded audio signal to another electronic device 301 through the IMS service 280, the RF module 290, and the antenna 291. The RF module 290 and the antenna 291 may correspond to the communication circuit 240 of FIG. 2.

During a call connection between the electronic device 201 and another electronic device 301, the electronic device 201 may perform communication with a base station through the RF module 290 and the antenna 291. When the electronic device 201 detects a call connection request from a user of the electronic device 201, the IMS service 280 may perform information exchange or negotiation with the base station. The electronic device 201 may determine codec information to be used for a call, through the information exchange or negotiation. The electronic device 201 may transmit the codec information to the preprocessor 265. The electronic device 201 may determine a first sampling rate corresponding to a frequency band supported by a call application of the electronic device 201, based on the codec information.

According to an embodiment, another electronic device 301 may receive an audio signal from the electronic device 201 through the RF module 390 and the antenna 391. The audio signal may be an audio signal that is encoded through the EVS encoder 270 in the electronic device 201.

According to still another embodiment, another electronic device 301 may decode the audio signal received from the electronic device 201 through the EVS decoder 370.

According to an embodiment, another electronic device 301 may process (or tune) the decoded audio signal through the postprocessor 364. Another electronic device 301 may process (or tune) the decoded audio signal through the postprocessor 364, based on a predetermined sample rate (e.g., the third sampling rate described in FIG. 2) and a clock. In an example, another electronic device 301 may cancel an echo of the decoded audio signal through the postprocessor 364, based on the predetermined sampling rate. For another example, another electronic device 301 may adjust a gain of the decoded audio signal through the postprocessor 364, based on the predetermined sampling rate. In yet another example, another electronic device 301 may adjust a volume of the decoded audio signal through the postprocessor 364, based on the predetermined sampling rate.

Another electronic device 301 may convert the processed audio signal corresponding to a digital signal into an analog signal through the audio codec 330. For example, another electronic device 301 may convert an audio signal of a user's voice corresponding to the digital signal into an analog signal through the audio codec 330. For another example, another electronic device 301 may convert an audio signal of music corresponding to the digital signal into an analog signal through the audio codec 330.

In an embodiment, another electronic device 301 may output the audio signal through the speaker 350. The audio signal may be an analog signal. Another electronic device 301 may output the audio signal converted into the analog signal. The analog signal may include a user's voice or music.

Figure 4:
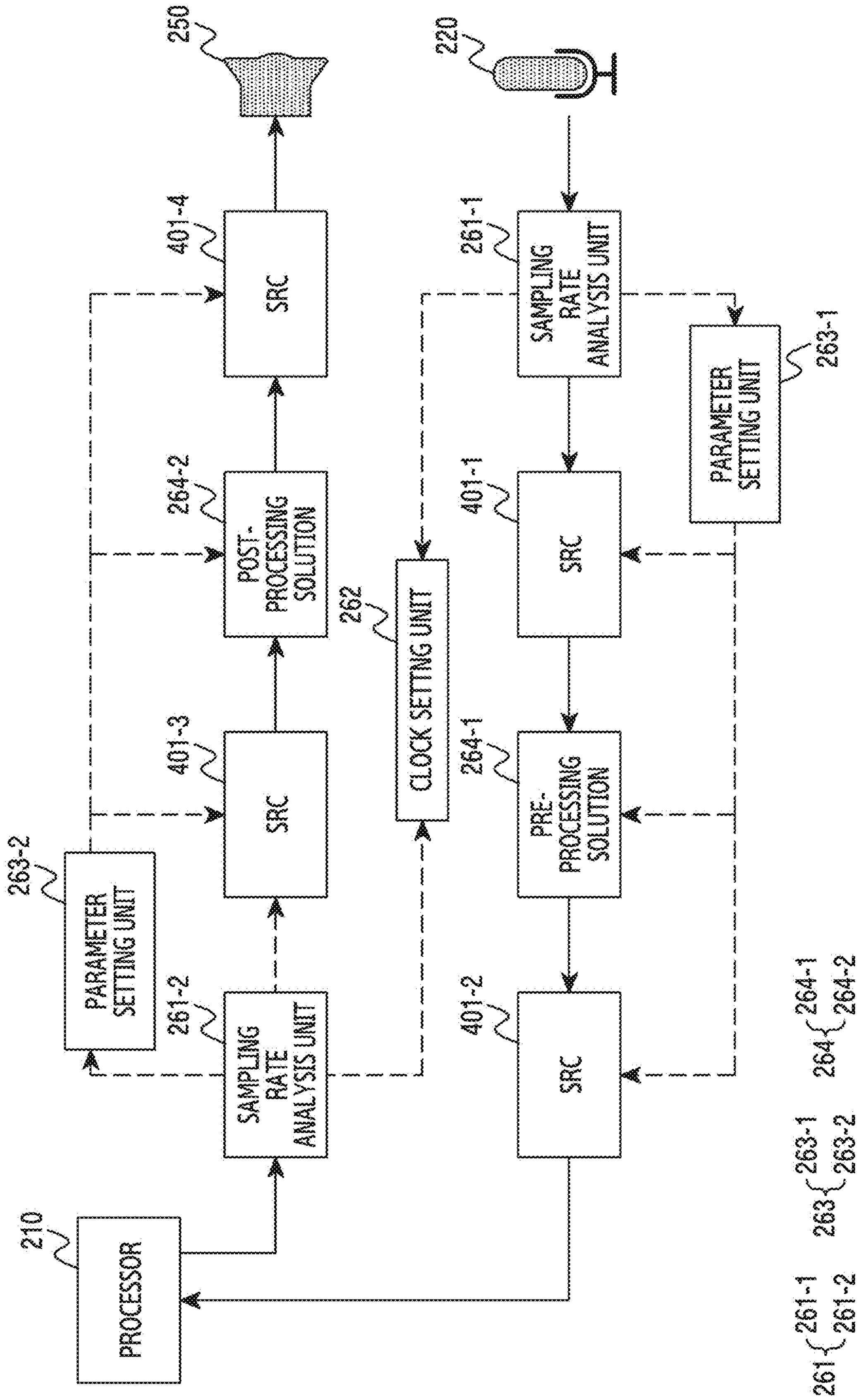
FIG. 4 illustrates a path through which an audio signal is processed in an electronic device during a call connection between the electronic device and another electronic device, according to an embodiment of the disclosure.

FIG. 4 illustrates a path through which an audio signal is processed in the electronic device 201 during a call connection between the electronic device 201 and another electronic device 301, according to an embodiment of the disclosure.

Referring to FIG. 4, the electronic device 201 may process an audio signal acquired through the microphone 220, through internal components (e.g., the sampling rate analysis unit 261, the clock setting unit 262, a sampling rate converter (SRC) 401, the parameter setting unit 263, and the pre/post-processing solution 264-1 and 264-2) of the electronic device 201, and transmit the processed audio signal to another electronic device 301. The electronic device 201 may process an audio signal received from another electronic device 301 through the internal components (e.g., the sampling rate analysis unit 261, the clock setting unit 262, the sampling rate converter (SRC) 401, the parameter setting unit 263, and the pre/post-processing solution 264-1 and 264-2) of the electronic device 201, and output the processed audio signal through the speaker 250.

According to an embodiment, the electronic device 201 may include the processor 210, the microphone 220, the sampling rate analysis unit 261, the clock setting unit 262, the parameter setting unit 263, the pre/post-processing solution 264-1 and 264-2, the SRC 401, and the speaker 250. Some of the components (e.g., the processor 210, the microphone 220, the sampling rate analysis unit 261, the clock setting unit 262, the parameter setting unit 263, the pre/post-processing solution 264-1 and 264-2, the SRC 401, and the speaker 250) shown in FIG. 4 may be software components or be components shown for convenience of explanation. For example, the sampling rate analysis unit 261, the clock setting unit 262, the parameter setting unit 263, and the pre/post-processing solution 264-1 and 264-2 may be software components.

The electronic device 201 may acquire an audio signal through the microphone 220. The audio signal may be an analog signal. The audio signal may include a user's voice or music. Although not illustrated in FIG. 4, the electronic device 201 may convert the acquired audio signal corresponding to an analog signal into a digital signal, through the audio codec 230. The electronic device 201 may transmit the audio signal converted into the digital signal, to a sampling rate analysis unit 261-1.

According to another embodiment, the electronic device 201 may identify a frequency band of the audio signal converted into the digital signal through the sampling rate analysis unit 261-1. The electronic device 201 may determine the type of the audio signal through the sampling rate analysis unit 261-1, based on the frequency band of the audio signal. For example, when the frequency band of the audio signal is a narrow band (NB), a wide band (WB), or a super wide band (SWB), the electronic device 201 may determine the type of the audio signal as a user's voice. For another example, when the frequency band of the audio signal includes a full band (FB), the electronic device 201 may determine the type of the audio signal as music.

According to still another embodiment, the electronic device 201 may identify a sampling rate (e.g., a second sampling rate of FIG. 5) of the audio signal through the sampling rate analysis unit 261-1. For example, the electronic device 201 may identify the sampling rate of the audio signal through the sampling rate analysis unit 261-1, based on the frequency band of the audio signal.

The electronic device 201 may compare a sampling rate (e.g., a first sampling rate of FIG. 5) corresponding to a frequency band supported by a call application of the electronic device 201 with the sampling rate (e.g., the second sampling rate of FIG. 5) of the audio signal. Based on the comparison result, the electronic device 201 may determine a sampling rate (e.g., a third sampling rate of FIG. 5) for tuning the audio signal. The electronic device 201 may compare values of the sampling rates with each other, and determine a sampling rate of a smaller value as the sampling rate for tuning the audio signal. For example, when the sampling rate corresponding to the frequency band supported by the call application is an SWB and the sampling rate of the audio signal is a WB, the electronic device 201 may determine, as the WB, the sampling rate for tuning the audio signal.

In an embodiment, the electronic device 201 may transmit information about the determined sampling rate for tuning the audio signal to the clock setting unit 262. The electronic device 201 may set a clock through the clock setting unit 262, based on the sampling rate for tuning the audio signal. The electronic device 201 may set a clock for the operation of the pre/post-processing solution 264-1 and 264-2. The higher the frequency band corresponding to the sampling rate for tuning the audio signal is, the more algorithms the processor 210 must process are, so a clock level may be increased.

In another embodiment, the electronic device 201 may transmit information about the determined sampling rate to the parameter setting unit 263-1. The electronic device 201 may determine a tuning parameter for tuning the audio signal through the parameter setting unit 263-1, based on the determined sampling rate. The electronic device 201 may transmit information about the determined tuning parameter to SRCs 401-1 and 401-2 and the pre-processing solution 264-1. The sampling rate converter (SRC) may mean converting a signal sampled in an arbitrary standard into sampling of another standard.

Table 1 below shows an embodiment of a method for determining a sampling rate for tuning the audio signal, and determining a clock and a tuning parameter according to the determined sampling rate.

TABLE 1

| | APP | Transceived signal classification | | Clock and tuning parameter dependent on sampling rate | | | |
|---|---|---|---|---|---|---|---|
| | Band | Music | Voice | CLK | NS | AGC | Filter |
| Case | NB | NB | NB | NB | NB | NB | NB |
| | WB | WB | NB | WB | WB | WB | WB |
| | SWB | SWB | WB | SWB or WB | SWB or WB | SWB or WB | SWB or WB |
| | FB | FB | SWB | FB or SWB | OFF or SWB | OFF or SWB | OFF or SWB |

The electronic device 201 may determine a sampling rate for tuning the audio signal according to Table 1 above. The electronic device 201 may determine a clock and a tuning parameter, based on the determined sampling rate. The APP Band may refer to a frequency band supported by a call application of the electronic device 201 during a call connection. A transceived signal may include an audio signal acquired through the microphone 220 of the electronic device 201 or an audio sign al received through the communication circuit 240 of the electronic device 201. The transceived signal may refer to a signal that is transceived during a call connection between the electronic device 201 and another electronic device 301. The CLK may mean clock, the NS may mean noise cancellation, and the AGC may mean automatic gain control.

In order for the electronic device 201 to perform a call with another electronic device 301, when a frequency band supported by a call application is an SWB, and a transceived signal is Voice (user voice), the electronic device 201 may determine a sampling rate for tuning an audio signal as a WB. The electronic device 201 may set a clock and a tuning parameter, based on the determined sampling rate corresponding to the WB. According to another embodiment, when the frequency band supported by the call application is an SWB, and the transceived signal is music, the electronic device 201 may determine the sampling rate for tuning the audio signal as the SWB. The electronic device 201 may set a clock and a tuning parameter, based on the determined sampling rate corresponding to the SWB.

According to an embodiment, an external device may be connected to the electronic device 201. For example, the external device is a device equipped with a microphone and may include a wireless earphone or a wireless headset. The electronic device 201 may be connected to the external device through short-range wireless communication (e.g., Bluetooth (BT)). The electronic device 201 may determine a sampling rate of an audio signal acquired through a microphone of the external device, based on a frequency band of the audio signal. The electronic device 201 may compare the sampling rate with a sampling rate corresponding to a frequency band supported by a call application and determine a sampling rate for tuning the audio signal. For example, when the electronic device 201 is connected to the external device through WB-only BT, and the sampling rate corresponding to the frequency band supported by the call application is an SWB, the electronic device 201 may determine a WB as the sampling rate for tuning the audio signal.

The electronic device 201 may determine a clock and a tuning parameter, based on the determined sampling rate corresponding to the WB.

The electronic device 201 may transmit an audio signal acquired through the microphone 220 to the pre-processing solution 264-1 through the sampling rate analysis unit 261-1 and the SRC 401-1.

According to another embodiment, the electronic device 201 may process (or tune) the audio signal, based on the determined tuning parameter. Although not illustrated in FIG. 4, the electronic device 201 may transmit the processed audio signal to another electronic device 301 through the SRC 401-2 and the communication circuit 240.

According to still another embodiment, the electronic device 201 may receive an audio signal from another electronic device 301 through a communication circuit (e.g., the communication circuit 240 of FIG. 2). The audio signal may include a user's voice or music. Although not illustrated in FIG. 4, the electronic device 201 may decode the audio signal through an EVS decoder (e.g., the EVS decoder 370 of FIG. 3). The electronic device 201 may transmit the decoded audio signal to the sampling rate analysis unit 261-2.

According to an embodiment, the electronic device 201 may identify a frequency band of the decoded audio signal through the sampling rate analysis unit 261-2. The electronic device 201 may determine the type of the decoded audio signal through the sampling rate analysis unit 261-2, based on the frequency band of the decoded audio signal. For example, when the frequency band of the audio signal is a narrow band (NB), a wide band (WB), or a super wide band (SWB), the electronic device 201 may determine the type of the audio signal as a user's voice. For another example, when the frequency band of the audio signal includes a full band (FB), the electronic device 201 may determine the type of the audio signal as music.

The electronic device 201 may identify a sampling rate (e.g., a second sampling rate of FIG. 5) of the decoded audio signal through the sampling rate analysis unit 261-2. For example, the electronic device 201 may identify a sampling rate of the decoded audio signal through the sampling rate analysis unit 261-2, based on the frequency band of the decoded audio signal.

The electronic device 201 may compare a sampling rate (e.g., a first sampling rate of FIG. 5) corresponding to a frequency band supported by a call application with the sampling rate (e.g., a second sampling rate of FIG. 5) of the decoded audio signal. Based on the comparison result, the electronic device 201 may determine a sampling rate (e.g., a third sampling rate of FIG. 5) for tuning the audio signal. The electronic device 201 may compare values of the sampling rates with each other, and determine a sampling rate of a smaller value as the sampling rate for tuning the audio signal. For example, when the sampling rate corresponding to the frequency band supported by the call application is an SWB, and the sampling rate of the audio signal is a WB, the electronic device 201 may determine the sampling rate for tuning the audio signal as the WB. For another example, when the sampling rate corresponding to the frequency band supported by the call application is an FB, and the type of the audio signal is voice, the electronic device 201 may determine the sampling rate for tuning the audio signal as the SWB or the WB. For further example, when the sampling rate corresponding to the frequency band supported by the call application is an FB, and the type of the audio signal is music, the electronic device 201 may determine the sampling rate for tuning the audio signal as the FB.

In an embodiment, the electronic device 201 may transmit information about the determined sampling rate to the clock setting unit 262. The electronic device 201 may set a clock through the clock setting unit 262, based on the determined sampling rate. The electronic device 201 may set a clock for the operation of the pre/post-processing solution 264-1 and 264-2.

In another embodiment, the electronic device 201 may transmit information about the determined sampling rate to the parameter setting unit 263-2. The electronic device 201 may determine a tuning parameter for tuning the audio signal through the parameter setting unit 263-2, based on the determined sampling rate. The electronic device 201 may transmit the information about the determined tuning parameter to SRCs 401-3 and 401-4 and a post-processing solution 264-2.

In yet another embodiment, the electronic device 201 may transmit an audio signal received through the communication circuit 240 to the post-processing solution 264-2 through the sampling rate analysis unit 261-2 and the SRC 401-3.

According to an embodiment, the electronic device 201 may process (or tune) the audio signal, based on the determined tuning parameter. Although not illustrated in FIG. 4, the electronic device 201 may output the processed audio signal through the SRC 401-4 and the speaker 250.

Figure 5:
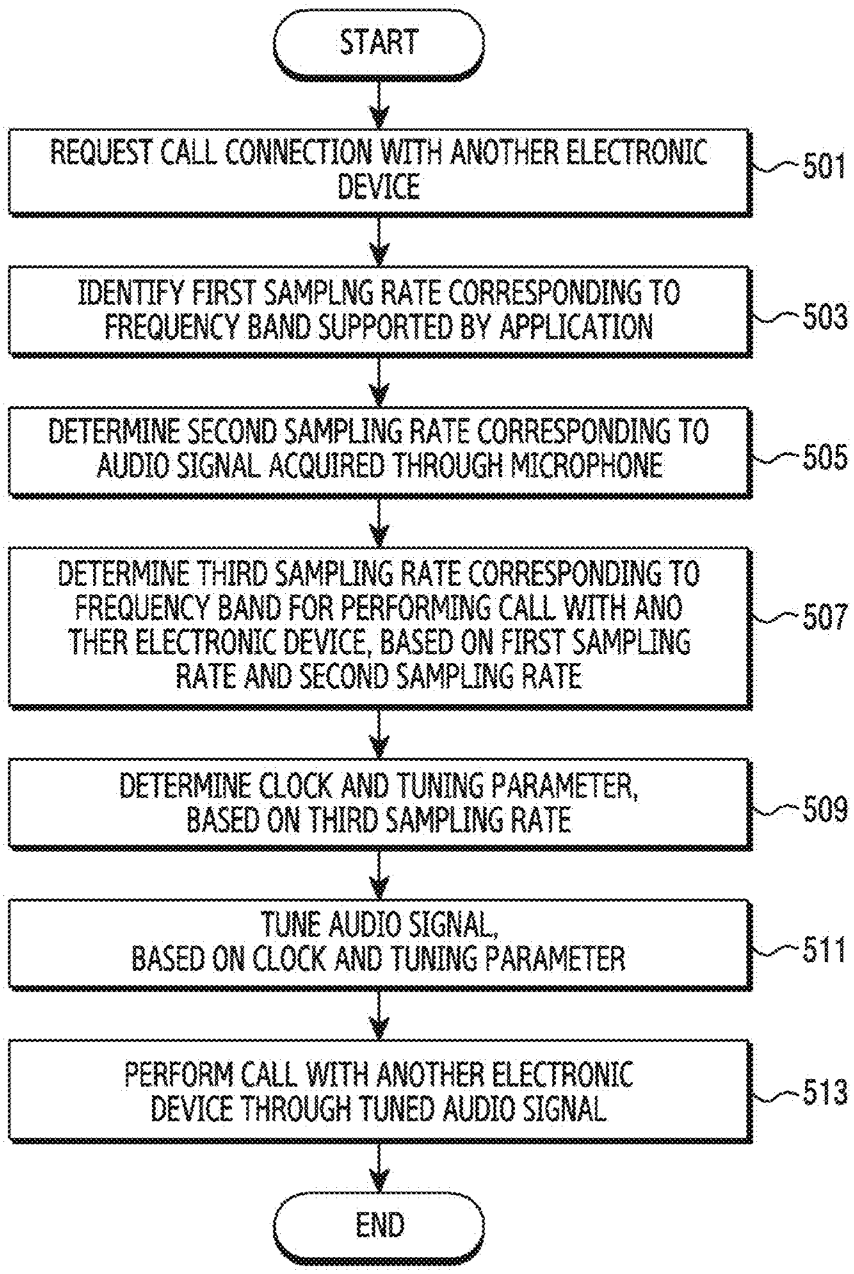
FIG. 5 illustrates a flowchart of an operation in which an electronic device performs a call connection by using a third sampling rate, according to an embodiment of the disclosure.

FIG. 5 illustrates a flowchart of an operation in which the electronic device 201 performs a call connection by using a third sampling rate, according to an embodiment of the disclosure.

A series of operations described below may be performed simultaneously or alternately by the electronic device 201 or a processor (e.g., the processor 120 of FIG. 1 or the processor 210 of FIG. 2), and some operations may be omitted or other operations may be added.

In operation 501, the electronic device 201 may acquire a request for a call connection with another electronic device 301 from a user of the electronic device 201 through an application (e.g., an application that supports a call function) of the electronic device 201. The electronic device 201 may acquire a message of requesting a call connection with another electronic device 301 from the user of the electronic device 201 through the application (e.g., the application that supports the call function) of the electronic device 201.

In operation 503, when the electronic device 201 acquires the call connection request or the message of requesting the call connection through the application (e.g., the application that supports the call function), the electronic device 201 may identify a first sampling rate corresponding to a frequency band supported by the application.

When the electronic device 201 acquires the call connection request or the message of requesting the call connection from the user of the electronic device 201, the electronic device 201 may perform information exchange or negotiation with a base station by using the IMS service 280. The electronic device 201 may determine codec information to be used during a call with another electronic device 301, by performing the information exchange or negotiation with the base station through the IMS service 280. The electronic device 201 may determine the first sampling rate corresponding to the frequency band supported by the application so as to perform the call with another electronic device 301, based on the codec information.

In operation 505, the electronic device 201 may acquire an audio signal through the microphone 220. The electronic device 201 may identify a frequency band of the audio signal through the sampling rate analysis unit 261. The electronic device 201 may determine a second sampling rate of the audio signal through the sampling rate analysis unit 261, based on the frequency band of the audio signal.

In operation 507, the electronic device 201 may determine a third sampling rate corresponding to a frequency band for performing a call with another electronic device 301, based on the first sampling rate and the second sampling rate. The third sampling rate may refer to a sampling rate for tuning an audio signal that is transceived while the electronic device 201 performs the call with another electronic device 301.

The electronic device 201 may compare the first sampling rate with the second sampling rate. Based on the comparison result, the electronic device 201 may determine the third sampling rate.

In operation 509, the electronic device 201 may determine a clock and a tuning parameter, based on the third sampling rate. For example, the electronic device 201 may determine the clock and tuning parameter corresponding to the third sampling rate corresponding to a WB.

In operation 511, the electronic device 201 may tune (or process) the audio signal, based on the determined clock and tuning parameter. The audio signal may mean an audio signal acquired through the microphone 220. The audio signal may include a user's voice or music.

In operation 513, the electronic device 201 may transmit the tuned audio signal to another electronic device 301 through the communication circuit 240. By transmitting the tuned audio signal to another electronic device 301, the electronic device 201 may perform a call with another electronic device 301.

Figure 6:
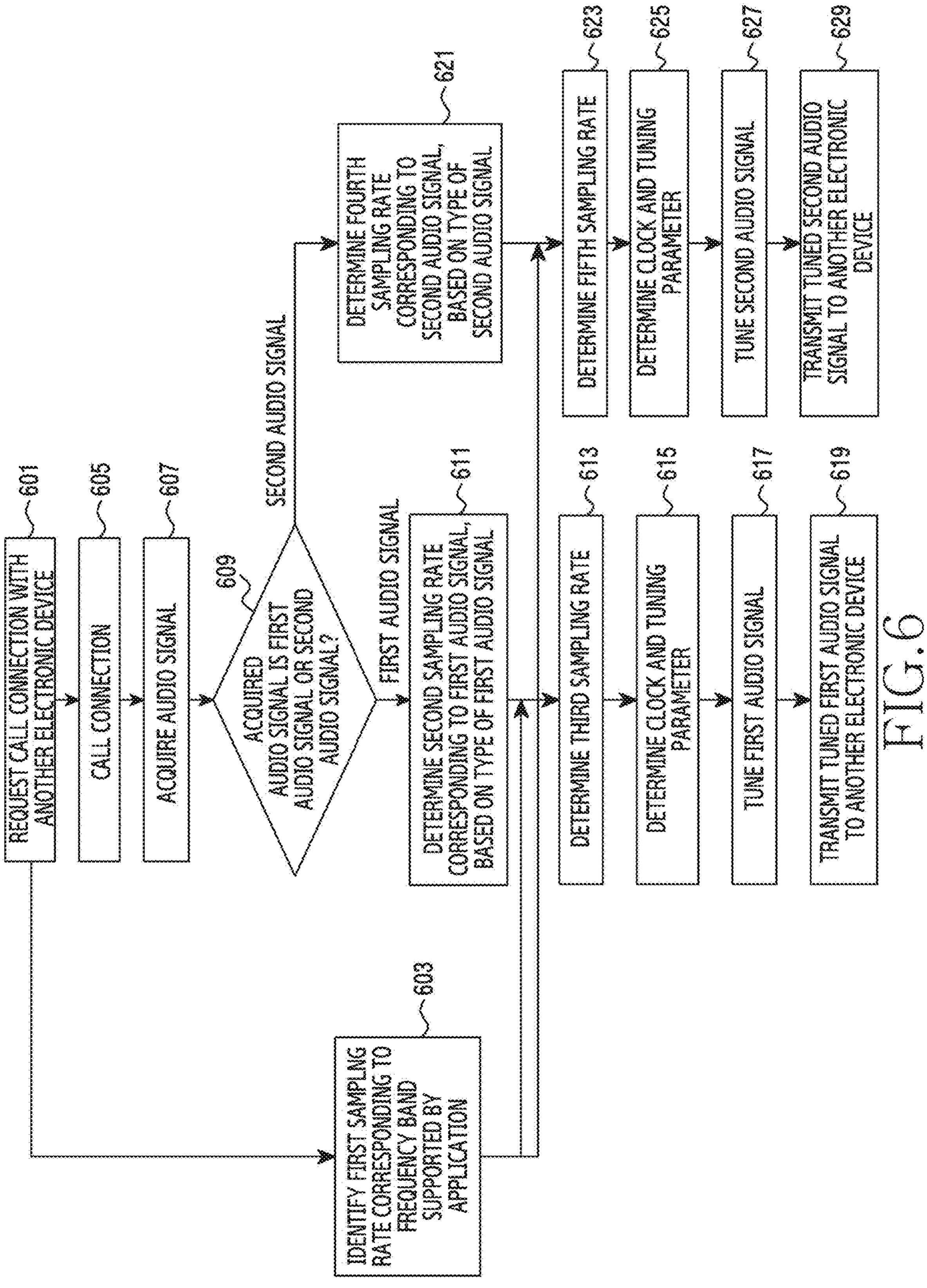
FIG. 6 illustrates a flowchart of an operation in which an electronic device performs a call connection by using a third sampling rate, according to an embodiment of the disclosure.

FIG. 6 illustrates a flowchart of an operation in which the electronic device 201 performs a call connection by using a third sampling rate, according to an embodiment of the disclosure.

A series of operations described below may be performed simultaneously or alternately by the electronic device 201 or a processor (e.g., the processor 120 of FIG. 1 or the processor 210 of FIG. 2), and some operations may be omitted or other operations may be added.

In operation 601, the electronic device 201 may acquire a call connection request or a message of requesting a call connection with another electronic device 301 from a user of the electronic device 201 through an application (e.g., an application that supports a call function) of the electronic device 201.

In operation 603, the electronic device 201 may determine (or identify) a first sampling rate corresponding to a frequency band supported by the application (e.g., the application that supports the call function). In response to acquiring the call connection request or the message of requesting the call connection from the user of the electronic device 201, the electronic device 201 may determine the first sampling rate corresponding to the frequency band supported by the application. During a call connection, the electronic device 201 may acquire codec information to be used for a call with another electronic device 301 from a base station, by performing negotiation with the base station through the IMS service 280. The electronic device 201 may determine the first sampling rate corresponding to the frequency band supported by the application so as to perform the call with another electronic device 301, based on the codec information.

In operation 605, in response to acquiring the call connection request or the message of requesting the call connection from the user of the electronic device 201, the electronic device 201 may perform the call connection with another electronic device 301. In response to acquiring the call connection request or the message from the user of the electronic device 201, the electronic device 201 may create a communication channel for transceiving an audio signal with another electronic device 301 and perform the call connection with another electronic device 301.

In operation 607, the electronic device 201 may acquire an audio signal during the call connection with another electronic device 301. For example, the electronic device 201 may acquire a first audio signal through the microphone 220 or acquire a second audio signal from an external electronic device (e.g., another electronic device 301) through the communication circuit 240. The first audio signal and the second audio signal may be signals corresponding to a user's voice or music.

When the audio signal acquired by the electronic device 201 is the first audio signal in operation 609, the electronic device 201 may perform operation 611 and when the audio signal acquired by the electronic device 201 is the second audio signal, the electronic device 201 may perform operation 621.

In operation 611, the electronic device 201 may determine a second sampling rate corresponding to the first audio signal, based on the type of the first audio signal. The type of the first audio signal may be either a user's voice or music.

In operation 613, the electronic device 201 may determine a third sampling rate, based on the identified first sampling rate and the determined second sampling rate. The third sampling rate may refer to a sampling rate used to tune an audio signal that is transceived when the electronic device 201 performs a call with another electronic device 301. The electronic device 201 may compare the first sampling rate with the second sampling rate. The electronic device 201 may determine the third sampling rate, based on the comparison result.

In operation 615, the electronic device 201 may determine a clock and a tuning parameter, based on the third sampling rate.

In operation 617, the electronic device 201 may tune (or process) the first audio signal, based on the clock and the tuning parameter.

In operation 619, the electronic device 201 may transmit the tuned first audio signal to another electronic device 301 through the communication circuit 240. The electronic device 201 may communicate with another electronic device 301 by transmitting the tuned first audio signal to another electronic device 301.

In operation 621, the electronic device 201 may determine a fourth sampling rate corresponding to the second audio signal, based on the type of the second audio signal. The type of the second audio signal may be either a user's voice or music.

In operation 623, the electronic device 201 may determine a fifth sampling rate, based on the identified first sampling rate and the determined fourth sampling rate. The fifth sampling rate may refer to a sampling rate used to tune an audio signal that is transceived when the electronic device 201 performs a call with another electronic device 301. The electronic device 201 may compare the first sampling rate with the fourth sampling rate. Based on the comparison result, the electronic device 201 may determine the fifth sampling rate. The third sampling rate and the fifth sampling rate refer to sampling rates for tuning audio signals that are transceived when the electronic device 201 performs the call with another electronic device 301, and the third sampling rate and the fifth sampling rate may be the same value.

In operation 625, the electronic device 201 may determine a clock and a tuning parameter, based on the fifth sampling rate.

In operation 627, the electronic device 201 may tune (or process) the second audio signal, based on the clock and the tuning parameter.

In operation 629, the electronic device 201 may output the tuned second audio signal through the speaker 250.

Figure 7:
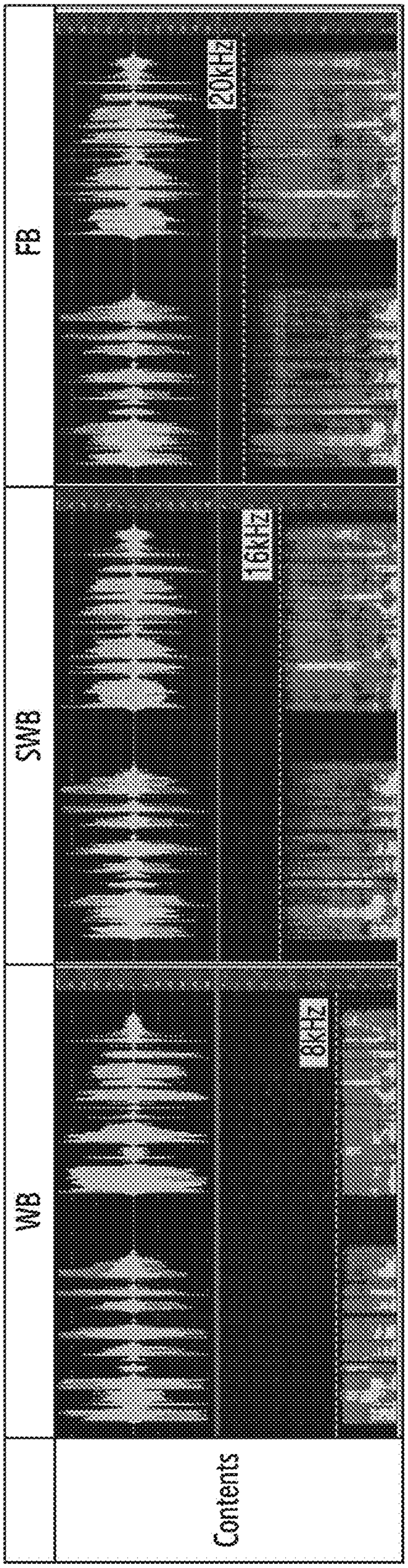
FIG. 7 illustrates a spectrogram dependent on a sampling rate, according to an embodiment of the disclosure.

FIG. 7 illustrates a spectrogram dependent on a sampling rate, according to an embodiment of the disclosure.

FIG. 7 may show a frequency signal for each sampling rate that is based on the type (e.g., a user's voice or music) of content included in a signal (e.g., an audio signal) that is transceived while the electronic device 201 performs a call with another electronic device 301.

According to an embodiment, a WB may have a frequency component up to an 8 kHz band, an SWB may have a frequency component up to a 16 kHz band, and an FB may have a frequency component up to a 20 kHz band.

Effects obtainable from the disclosure are not limited to the effects mentioned above, and other effects not mentioned may be clearly understood by those skilled in the art from the description below.

Methods of embodiments described in the claims or specification of the disclosure may be implemented in the form of hardware, software, or a combination of hardware and software.

When implemented as software, a computer-readable storage medium that stores one or more programs (software modules) may be provided. The one or more programs stored in the computer-readable storage medium are configured to be executable by one or more processors in an electronic device. The one or more programs include instructions that allow the electronic device to execute the methods of the embodiments described in the claims or specification of the disclosure.

These programs (software modules and software) may be stored in random access memory, non-volatile memory including flash memory, read only memory (ROM), and electrically erasable programmable ROM (EEPROM), magnetic disc storage device, compact disc-ROM (CD-ROM), digital versatile discs (DVDs) or other types of optical storage devices, and magnetic cassette. Or, it may be stored in memory consisting of a combination of some or all of these. Also, a plurality of configuration memories may be included as well.

Also, the program may be stored in an attachable storage device that is accessible through a communication network such as the Internet, an intranet, a local area network (LAN), a wide area network (WAN), or a storage area network (SAN), or a communication network consisting of a combination thereof. This storage device may be connected to a device performing an embodiment of the disclosure through an external port. Additionally, a separate storage device on a communication network may be connected to a device performing an embodiment of the disclosure.

In the specific embodiments of the disclosure described above, components included in the disclosure are expressed in singular or plural numbers according to the specific embodiment presented. However, the singular or plural expression is selected to suit the presented situation for convenience of explanation, and the disclosure is not limited to singular or plural components, and even components expressed in a plural number may be comprised in a singular number or even components expressed in a singular number may be comprised in a plural number.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device individually or collectively, cause the electronic device to perform a method of the disclosure.

Any such software may be stored in the form of volatile or non-volatile storage such as, for example, a storage device like read only memory (ROM), whether erasable or rewritable or not, or in the form of memory such as, for example, random access memory (RAM), memory chips, device or integrated circuits or on an optically or magnetically readable medium such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a microphone;
memory storing one or more computer programs; and
one or more processors communicatively connected to the microphone and the memory,
wherein the one or more computer programs include computer-executable instructions that, when executed by the one or more processors individually or collectively, cause the electronic device to:
acquire, through an application, a request for performing a call with another electronic device,
in response to the acquisition of the request, identify a first sampling rate corresponding to a frequency band supported by the application so as to perform communication with another electronic device,
acquire an audio signal through the microphone,
identify a frequency band of the audio signal,
determine a type of the audio signal, based on the frequency band,
determine a second sampling rate corresponding to the audio signal, based on the type of the audio signal,
determine a third sampling rate corresponding to a frequency band for performing a call with another electronic device, based on the first sampling rate and the second sampling rate,
determine a clock and a tuning parameter, based on the third sampling rate, and
tune the audio signal, based on the clock and the tuning parameter.

2. The electronic device of claim 1, further comprising:
a communication circuit,
wherein the one or more computer programs further include computer-executable instructions that, when executed by the one or more processors individually or collectively, cause the electronic device to transmit the tuned audio signal to another electronic device through the communication circuit.

3. The electronic device of claim 1, wherein the one or more computer programs further include computer-executable instructions that, when executed by the one or more processors individually or collectively, cause the electronic device to:
compare the first sampling rate with the second sampling rate, and
determine the third sampling rate, based on the comparison result.

4. The electronic device of claim 1, wherein the application comprises an application that supports a call function.

5. The electronic device of claim 1, wherein the type of the audio signal comprises a user's voice or music.

6. The electronic device of claim 1, further comprising:
a communication circuit,
wherein the one or more computer programs further include computer-executable instructions that, when executed by the one or more processors individually or collectively, cause the electronic device to:
in response to the acquisition of the request, perform communication with a base station through the communication circuit,
determine codec information used to perform the call with another electronic device, and
identify the first sampling rate, based on the codec information.

7. An electronic device comprising:
a speaker;
a communication circuit;
memory storing one or more computer programs; and
one or more processors communicatively connected to the speaker, the communication circuit, and the memory,
wherein the one or more computer programs include computer-executable instructions that, when executed by the one or more processors individually or collectively, cause the electronic device to:
acquire, through an application, a request for performing a call with another electronic device,
in response to the acquisition of the request, identify a first sampling rate corresponding to a frequency band supported by the application so as to perform communication with another electronic device,
acquire an audio signal from another electronic device through the communication circuit,
identify a frequency band of the audio signal,
determine a type of the audio signal, based on the frequency band,
determine a second sampling rate corresponding to the audio signal, based on the type of the audio signal,
determine a third sampling rate corresponding to a frequency band for performing a call with another electronic device, based on the first sampling rate and the second sampling rate,
determine a clock and a tuning parameter, based on the third sampling rate,
tune the audio signal, based on the clock and the tuning parameter, and
output the tuned audio signal through the speaker.

8. The electronic device of claim 7, wherein the one or more computer programs further include computer-executable instructions that, when executed by the one or more processors individually or collectively, cause the electronic device to:
compare the first sampling rate with the second sampling rate, and
determine the third sampling rate, based on the comparison result.

9. The electronic device of claim 7, wherein the application comprises an application that supports a call function.

10. The electronic device of claim 7, wherein the type of the audio signal comprises a user's voice or music.

11. An electronic device comprising:
a microphone;
a communication circuit;
memory storing one or more computer programs; and
one or more processors communicatively connected to the microphone, the communication circuit, and the memory,
wherein the one or more computer programs include computer-executable instructions that, when executed by the one or more processors individually or collectively, cause the electronic device to:
acquire, through an application, a request for performing a call with another electronic device,
in response to the acquisition of the request, identify a first sampling rate corresponding to a frequency band supported by the application so as to perform communication with another electronic device,
receive an audio signal acquired through a microphone comprised in an external device, from the external device connected to the electronic device, through the communication circuit, identify a frequency band of the audio signal, determine a type of the audio signal, based on the frequency band, determine a second sampling rate corresponding to the audio signal, based on the type of the audio signal, determine a third sampling rate corresponding to a frequency band for performing a call with another electronic device, based on the first sampling rate and the second sampling rate, determine a clock and a tuning parameter, based on the third sampling rate, and tune the audio signal, based on the clock and the tuning parameter.

12. The electronic device of claim 11, wherein the one or more computer programs further include computer-executable instructions that, when executed by the one or more processors individually or collectively, cause the electronic device to transmit the tuned audio signal to another electronic device through the communication circuit.

13. The electronic device of claim 11, wherein the one or more computer programs further include computer-executable instructions that, when executed by the one or more processors individually or collectively, cause the electronic device to:

compare the first sampling rate with the second sampling rate, and determine the third sampling rate, based on the comparison result.

14. The electronic device of claim 11, wherein the application comprises an application that supports a call function.

15. The electronic device of claim 11, wherein the type of the audio signal comprises a user's voice or music.

16. The electronic device of claim 11, wherein the one or more computer programs further include computer-executable instructions that, when executed by the one or more processors individually or collectively, cause the electronic device to:

in response to the acquisition of the request, perform communication with a base station through the communication circuit, determine codec information used to perform the call with another electronic device, and identify the first sampling rate, based on the codec information.

17. One or more non-transitory computer-readable storage media storing one or more computer programs including computer-executable instructions that, when executed by one or more processors of an electronic device individually or collectively, cause the electronic device to perform operations, the operations comprising:

acquiring, through an application, a request for performing a call with another electronic device;

in response to the acquisition of the request, identifying a first sampling rate corresponding to a frequency band supported by the application so as to perform communication with another electronic device;

acquiring an audio signal through a microphone;

identifying a frequency band of the audio signal;

determining a type of the audio signal, based on the frequency band;

determining a second sampling rate corresponding to the audio signal, based on the type of the audio signal;

determining a third sampling rate corresponding to a frequency band for performing a call with another electronic device, based on the first sampling rate and the second sampling rate;

determining a clock and a tuning parameter, based on the third sampling rate; and tuning the audio signal, based on the clock and the tuning parameter.

18. The one or more non-transitory computer-readable storage media of claim 17, the operations further comprising:

transmitting the tuned audio signal to another electronic device through a communication circuit;

comparing the first sampling rate with the second sampling rate; and determining the third sampling rate, based on the comparison result.

* * * * *